United States Patent [19]

Jalan et al.

[11] 4,442,078

[45] Apr. 10, 1984

[54] METHOD OF REMOVING HYDROGEN SULFIDE FROM GASES UTILIZING A ZINC OXIDE SORBENT AND REGENERATING THE SORBENT

[75] Inventors: Vinod M. Jalan, Concord; David G. Frost, Maynard, both of Mass.

[73] Assignee: The United States of America as represented by the United States Department of Energy, Washington, D.C.

[21] Appl. No.: 395,894

[22] Filed: Jul. 7, 1982

[51] Int. Cl.$^3$ ............................................. B01D 53/34
[52] U.S. Cl. ................................... 423/230; 423/231; 502/38; 502/51; 502/52
[58] Field of Search ...................... 423/224, 230, 231; 252/411 S; 502/38, 51, 52

[56] References Cited

U.S. PATENT DOCUMENTS

| | | | |
|---|---|---|---|
| 2,273,297 | 2/1942 | Szayna | 252/411 S |
| 2,551,905 | 5/1951 | Robinson | 423/230 |
| 3,974,256 | 8/1976 | Wheelock et al. | 423/230 |
| 4,002,720 | 1/1977 | Wheelock et al. | 423/230 |
| 4,180,549 | 12/1979 | Olsson et al. | 423/230 |
| 4,212,851 | 7/1980 | Nemeth et al. | 252/411 S |

OTHER PUBLICATIONS

Jolan, "High Temperature DeSulfurization of Coal Gases by Regenerative Sorption", 1981 International Gas Research Conference, Los Angeles, California, Sep. 28–Oct. 1, 1981.

*Primary Examiner*—Earl C. Thomas
*Attorney, Agent, or Firm*—Robert J. Fisher; Hugh W. Glenn; Michael F. Esposito

[57] ABSTRACT

A spent solid sorbent resulting from the removal of hydrogen sulfide from a fuel gas flow is regenerated with a steam-air mixture. The mixture of steam and air may also include additional nitrogen or carbon dioxide. The gas mixture contacts the spent sorbent containing metal sulfide at a temperature above 500° C. to regenerate the sulfide to metal oxide or carbonate. Various metal species including the period four transition metals and the lanthanides are suitable sorbents that may be regenerated by this method. In addition, the introduction of carbon dioxide gas permits carbonates such as those of strontium, barium and calcium to be regenerated. The steam permits regeneration of spent sorbent without formation of metal sulfate. Moreover, the regeneration will proceed with low oxygen concentrations and will occur without the increase in temperature to minimize the risk of sintering and densification of the sorbent.

1 Claim, 1 Drawing Figure

METHOD OF REMOVING HYDROGEN SULFIDE FROM GASES UTILIZING A ZINC OXIDE SORBENT AND REGENERATING THE SORBENT

CONTRACTUAL ORIGIN OF THE INVENTION

The United States Government has rights in this invention pursuant to Prime Contract No. W-31-109-ENG-38 between the U.S. Department of Energy and Argonne National Laboratory and Subcontract No. 31-109-38-5804 with Giner, Inc.

BACKGROUND OF THE INVENTION

The present invention relates to the removal of sulfur containing gases from gaseous fuel mixtures and the regeneration of sorbents used in this removal. The invention particularly relates to the regeneration of sorbents used for the high-temperature removal of hydrogen sulfide from fuel gases that are to be employed in fuel cell use for the generation of electricity.

Carbonaceous fuel and feedstock gases including both natural gas and producer gas often include sulfur-containing components such as hydrogen sulfide that may poison catalysts involved in conversion or utilization processes. This is particularly true in the case of feed gas for high-temperature, electrical fuel cells. Electrodes including nickel and other substances having important catalytic activity may be affected adversely by the presence of hydrogen sulfide in the fuel.

Some commercial methods for removing hydrogen sulfide from carbonaceous fuel gases involve scrubbing the gas stream with liquid solutions at a relatively low temperatures of about 100°-150° C. Such low temperatures are disadvantageous in processes for cleaning fuel for high-temperature applications such as molten carbonate and solid oxide fuel cells. Such fuel cells may operate at temperatures of 500°-1000° C. or above.

Various sorbents such as copper oxide, zinc oxide, iron oxide and other transition metal oxides have been employed at high temperatures for removing hydrogen sulfide from fuel gases. This spent sorbent contains sulfides of the metal and must be regenerated to the oxide prior to continued use or discarded. Regeneration by roasting in air or oxygen can be slow, costly and possibly sinter the sorbent material to reduce its porosity and effectiveness. Steam also has been used as a desorbing gas but with minimal effectiveness unless followed by oxidation with air or other oxygen-containing gas.

In the regeneration of such materials at high-temperatures by roasting in air or oxygen exothermic reactions occur that increase the risk of sintering. Severe loss of specific surface area can occur rendering such processes disadvantageous in the regeneration of spent solid sorbent material.

These previous methods are illustrated in the U.S. Pat. Nos. 3,974,256 and 4,002,720 to Wheelock et al. In these patents a spent lanthanide oxide sorbent is treated in a two step process involving initial desorption with steam followed by regeneration with an oxidizing gas. In these processes the steam desorption alone was found to be ineffective. Additional treatment with oxygen or air at elevated temperatures was required to effectively regenerate the sorbent.

SUMMARY OF THE INVENTION

Therefore in view of the foregoing, it is an object of the present invention to provide an improved method of regenerating a spent solid sorbent used in hydrogen sulfide gas removal.

It is a further object to provide improved regeneration process for spent solid sorbent that minimizes high-temperature sintering of the sorbent structure.

It is also an object to provide a regeneration method for spent sorbent that does not involve a substantial temperature increase.

In accordance with the present invention, a method is presented for regenerating a spent solid sorbent used in the removal of hydrogen sulfide from a fuel gas flow. The spent sorbent is contacted at a temperature above 500° C. with a mixture of a desorption gas comprising steam and oxygen to regenerate metal sulfide to an oxide or carbonate of the metal capable of sorbing hydrogen sulfide from a gas flow containing the same.

In more particular aspects of the invention the metal combined as sulfide or oxide is selected from the transition metals, preferably copper, zinc, iron, nickel, chromium, vanadium, tungsten or mixtures thereof.

In one other aspect of the invention the metal combined as sulfur or carbonate is selected from group IIA alkaline earth metals including strontium, calcium, and barium and the desorption gas includes steam, oxygen, nitrogen and carbon dioxide to regenerate the metal sulfide to metal carbonate capable of removing hydrogen sulfide from a gas flow.

In other specific aspects the spent solid sorbent is contacted with the desorption gas at a temperature of 650°-750° C. to regenerate metal sulfide to an oxide of the metal without formation of metal sulfate, an undesirable side reaction.

In further aspects of the invention the desorption gas includes by volume 5–99% steam, 1–15% oxygen and 0–94% diluent selected from nitrogen or carbon dioxide. The oxygen is preferably included at about 2–5 percent by volume in a steam and nitrogen mixture including about 10–30% by volume steam.

In one other aspect of the invention the spent solid sorbent is regenerated by converting the metal sulfide to release sulfur dioxide gas without significant increase in temperature.

BRIEF DESCRIPTION OF THE DRAWINGS

The present invention is illustrated in the accompanying drawing wherein the FIGURE is a graph of fractional regeneration vs. time.

DETAILED DESCRIPTION OF THE PREFERRED EMBODIMENT

Figure 1:
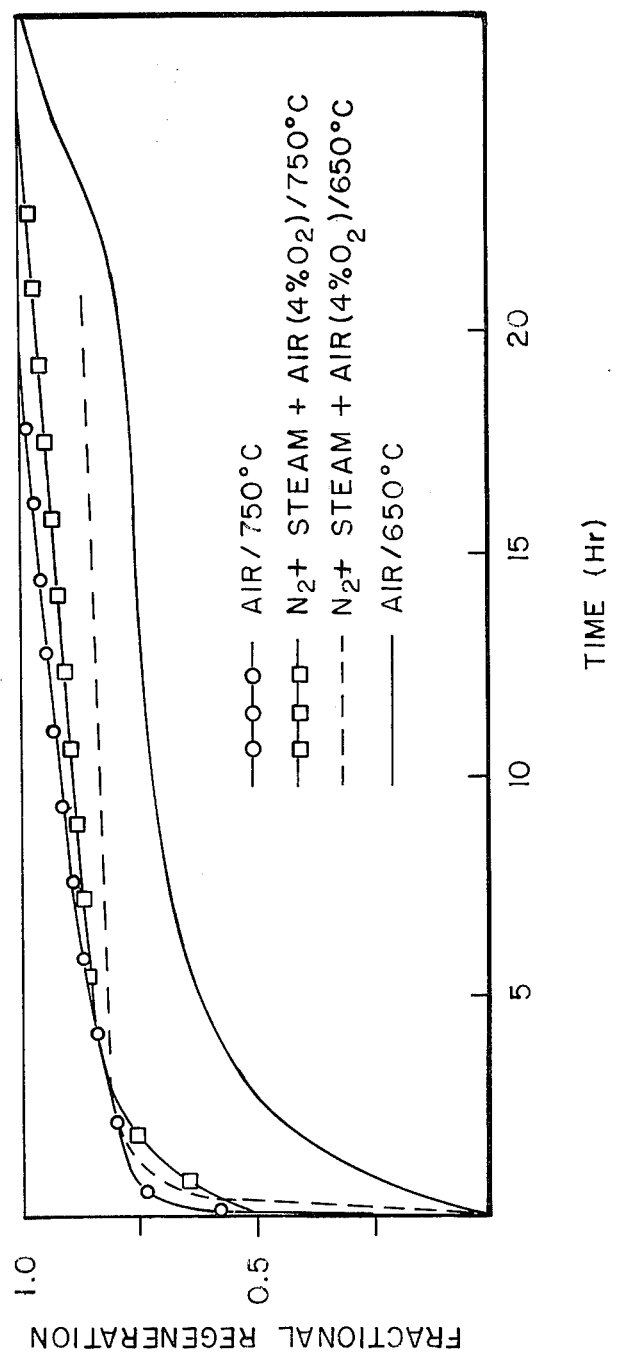

Porous solid sorbents such as the oxides of the transition metals and of the lanthanides as well as alkaline earth metal carbonates are contemplated for use in removing hydrogen sulfide from fuel gases. In some instances the oxides can be reduced to the elemental metal or to a lower oxide species as is discussed for copper on a zinc oxide support in the assignees copending application by John E. Young and Vinod M. Jalan entitled "High Temperature Sorbent Method for Removal of Sulfur Containing Gases from Gaseous Mixtures", U.S. patent application Ser. No. 395,895, filed July 7, 1982. The oxides, carbonates or elemental metals present in the sorbents typically are converted to sulfides as they take up hydrogen sulfide thus rendering the sorbent ineffective for further desulfurization of the fuel gas.

In one manner of carrying out the regeneration process of the present invention, a porous bed of spent sorbent having a portion of its capacity converted to metal sulfide is contacted with a flow of desorption gas at a temperature above 500° C. Preferably temperatures of about 650°-750° C. are used.

The desorption gas includes steam, oxygen and in most instances a diluent gas such as nitrogen or carbon dioxide. Oxygen is conveniently provided as air with its approximately 79% by volume nitrogen. A small portion of carbon dioxide is also present in air but additional amounts of carbon dioxide may be advantageous or necessary when a carbonate sorbent is regenerated. It is contemplated that the desorption gas will contain by volume about 1-15% oxygen, 5-99% steam and 0-94% diluent gas selected from nitrogen, carbon dioxide or mixtures of these diluents.

Spent sorbents that advantageously can be regenerated by the present method include species of various metals. The period four transition metals comprise vanadium, manganese, chromium, iron, cobalt, nickel, copper and zinc. The series of metals include elemental or oxide species that are capable of sorbing sulfur containing gases and can be regenerated to the original state. Other transition metals such as tungsten and their oxides also may serve as regenerable sorbents. In addition it is seen in the patents cited above in the Background of the Invention that various lanthanides and their oxides can be employed as regenerable hydrogen sulfide sorbents.

It also has been found that certain alkaline earth metal carbonates from the IIA series of the periodic table including calcium, barium and strontium can be used to remove hydrogen sulfide from a gas stream. Subsequently these spent sorbents can be regenerated at least in part to the carbonate. Of these strontium carbonate has proven the most effective regenerable sorbent. The desorption gas flow employed in the regeneration of these solid spent sorbents also will include a sufficient concentration of carbon dioxide to renew the carbonate. Each of these lanthanides, transition metals and alkaline earth metals combined as oxides, sulfides or carbonates as well as the elemental metals are contemplated within the scope of the present regeneration method.

The inventors have found that a spent solid sorbent containing a metal sulfide can be regenerated essentially without the net increase in temperature of the reaction bed by contacting the spent sorbent with a gas mixture containing steam and oxygen gas. In addition to the oxygen at least the amount of nitrogen associated with air is included in providing a convenient source of the oxygen gas. Contact is carried out at a temperature above about 500° C. preferably about 650°-750° C. and continued until the desired regeneration has occurred.

The following examples are presented as an illustration of the method of the present invention.

COMPARATIVE EXAMPLE I

A bed of partially spent zinc oxide pellets (United Catalyst Inc-type C-72-01) containing between 5-10 weight percent zinc sulfide was contacted with a mixture having about 30 parts of steam to 70 parts nitrogen gas by volume at 650° C. for a period of about 1 hour. Under these conditions only negligable amounts of $H_2S$ desorption was observed. The temperature was subsequently increased to 750° C. and following a period of approximately 5 hours total only about 30% regeneration was observed.

EXAMPLE II

After the initial processing of the spent sorbent material as described above in Comparative Example I, a small amount of air was introduced into the nitrogen and steam flow at about 750° C. The rate of sulfur removal accelerated unexpectedly and continued to near completion. After approximately 1 hour additional processing with the nitrogen, steam and air mixture about 80% regeneration of the sorbent was observed.

COMPARATIVE EXAMPLE III

Porous pellets of zinc oxide following exposure to a hydrogen sulfide containing gas were treated in a small fixed bed with a flow of 650° C. air. The regeneration was conducted at a space velocity of about 2200 volumes of air per volume of sorbent per hour. Following regeneration for 24½ hours, the sample was again used for the desulfurization of a simulated fuel gas containing hydrogen sulfide followed by a second regeneration. Table I gives the performance of both the the desulfurization and regeneration steps. The sorbent capacity is given in percent of theoretical stoichiometric capacity.

TABLE I

| History | Regeneration Temp °C. | Time Hrs. | Desulfurization Time until 15 ppm | Capacity until 15 ppm |
|---|---|---|---|---|
| Fresh | — | — | 3.75 | 5.50% |
| 1st Regeneration | 650 | 24.50 | 3.50 | 5.13% |
| 2nd Regeneration | 750 | 19.00 | 4.25 | 6.23% |

EXAMPLE IV

A small bed of zinc oxide pellets was employed as in Comparative Example III except that the sorbent is repetitively regenerated by a flow of steam, nitrogen and air having approximately 55% nitrogen, 25% steam and 20% air (4% oxygen) by volume. A space velocity of about 3200 volumes of a desorbent gas per volume of sorbent per hour was employed. The results show an increased capacity for removal of hydrogen sulfide from the simulated fuel gas and the ability to adequately regenerate the sorbent at 650° C. The results are given in Table II below.

TABLE II

| History | Regeneration Temp °C. | Time Hrs. | Desulfurization Time until 15 ppm | Capacity until 15 ppm |
|---|---|---|---|---|
| Fresh | — | — | 5.00 | 7.33% |
| 1st Regeneration | 750 | 27.00 | 6.50 | 9.53% |
| 2nd Regeneration | 750 | 21.75 | 6.50 (for 1 ppm) | 9.5% (for 1 ppm) |
| 3rd Regeneration | 650 | 21.25 | 8.10 | 11.9% |

The above regeneration efforts also are illustrated in the FIGURE. It is clearly seen that after only two to three hours of regeneration with the steam-air mixture at 650° C., a substantial portion, that is about 75%, of the sorbent is renewed. However, with air regeneration only a small fraction of the sorbent is renewed at 650° C. after a like period.

In like manner a partially spent zinc oxide sorbent was effectively regenerated with a desorbent gas containing about 28% steam and 72% air (15% oxygen) by volume.

It is seen from the above that the present invention provides an improved method for regenerating a solid spent sorbent through use of a steam-air mixture. The spent sorbent is regenerated to the metal oxide without formation of metal sulfate and with good capability for futher sorption of hydrogen sulfide in a subsequent use. The regeneration can be effectively employed at lower temperatures than that required for air oxidation regeneration and does not appear to elevate temperature of the reaction bed. Thus the present process is not only efficient in removing sulfur but also results in a reduced risk of sintering and densification of the sorbent.

Although the present invention has been described in terms of particular materials and process steps it will be clear to one skilled in the art that various modifications can be made with the scope of the following claims.

The embodiments of this invention in which an exclusive property or privilege is claimed are defined as follows:

1. A method of repetitively generating a spent sorbent containing zinc sulfide to form zinc oxide in conjunction with a hydrogen sulfide sorption process, wherein said zinc oxide sorbent is repetitively spent to form zinc sulfide, said method in each repetition consisting essentially of contacting said spent sorbent with a desorbent gas mixture flow consisting essentially of approximately 55% nitrogen, 25% steam and 20% air (4% oxygen) by volume at a space velocity of about 3200 gas to sorbent volumes per hour at a temperature of about 650° C. for a period of about 2 to 3 hours to provide about 75% sorbent renewal.

* * * * *